US011567225B2

United States Patent
Jiang et al.

(10) Patent No.: US 11,567,225 B2
(45) Date of Patent: Jan. 31, 2023

(54) FAULT SKELETONIZATION FOR FAULT IDENTIFICATION IN A SUBTERRANEAN ENVIRONMENT

(71) Applicant: Landmark Graphics Corporation, Houston, TX (US)

(72) Inventors: Fan Jiang, Sugar Land, TX (US); Phil Norlund, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 256 days.

(21) Appl. No.: 16/993,525

(22) Filed: Aug. 14, 2020

(65) Prior Publication Data

US 2022/0050221 A1 Feb. 17, 2022

(51) Int. Cl.
*G01V 1/34* (2006.01)
*G06V 10/30* (2022.01)
*E21B 49/00* (2006.01)
*G01V 1/28* (2006.01)
*G01V 1/30* (2006.01)
(Continued)

(52) U.S. Cl.
CPC .............. *G01V 1/345* (2013.01); *E21B 49/00* (2013.01); *G01V 1/282* (2013.01); *G01V 1/30* (2013.01); *G06K 9/6256* (2013.01); *G06K 9/6289* (2013.01); *G06T 3/4046* (2013.01); *G06V 10/30* (2022.01); *E21B 2200/20* (2020.05)

(58) Field of Classification Search
CPC .......... G01V 1/345; G01V 1/282; G01V 1/30; G06V 10/30; E21B 49/00; E21B 2200/20; G06K 9/6256; G06K 9/6289; G06T 3/4046
See application file for complete search history.

(56) References Cited

U.S. PATENT DOCUMENTS

2006/0122780 A1 6/2006 Cohen et al.
2011/0048731 A1 3/2011 Imhof et al.
(Continued)

FOREIGN PATENT DOCUMENTS

WO 2021050122 3/2021

OTHER PUBLICATIONS

Application No. PCT/US2020/046326 , International Search Report and Written Opinion, dated Feb. 24, 2021, 9 pages.
(Continued)

*Primary Examiner* — Mohamed Charioui
*Assistant Examiner* — Christine Y Liao
(74) *Attorney, Agent, or Firm* — Kilpatrick Townsend & Stockton LLP (57) ABSTRACT

A system can receive fault likelihood data about a subterranean environment and apply a binary mask filter using a tuning parameter to convert the fault likelihood data to binary distribution data having a plurality of pixels arranged in a plurality of profiles in at least two directions. The system can perform, for each profile of the plurality of profiles, fault skeletonization on the binary distribution data to form fault skeletonization data with pixels connected that represent part of a fracture. The system can convert the fault skeletonization data to seismic volume data and combine and filter the seismic volume data in the at least two directions to form combined seismic volume data. The system can output the combined seismic volume data as an image for use in detecting objects to plan a wellbore operation.

20 Claims, 4 Drawing Sheets

(51) Int. Cl.
*G06K 9/62* (2022.01)
*G06T 3/40* (2006.01)

(56) References Cited

U.S. PATENT DOCUMENTS

| | | | |
|---|---|---|---|
| 2013/0201787 A1 | 8/2013 | Vermilye et al. | |
| 2019/0277991 A1 | 9/2019 | Shabelansky et al. | |
| 2019/0302290 A1* | 10/2019 | Alwon | G01V 1/282 |
| 2020/0183032 A1 | 6/2020 | Liu et al. | |
| 2021/0247535 A1* | 8/2021 | Fitz-Gerald | G01V 1/282 |

OTHER PUBLICATIONS

Pochet, "Modeling of Geobodies: AI for Seismic Fault Detection and All-quadrilateral Mesh Generation", Pontificia Universidade Catolica do Rio de Janerio, Sep. 2018, pp. 13-68.

Hale, "Fault Surfaces and Fault Throws From D3 Seismic Images", Center for Wave Phenomena, Colorado School of Mines, Golden, CO, 2012, pp. 205-220.

Jerripothula et al., "Object Co-skeletonization with Co-segmentation", IEEE Conference on Computer Vision and Pattern Recognition, 2017, 9 pages.

Vasudevan et al., "Adaptation of Seismic Skeletonization for Other Geoscience Applications", Geophys. J. Int., 162, 2005, pp. 975-993.

Vasudevan et al., "Seismic Skeletonization: A Useful Tool for Geophysical Data Analysis", Canadian Society of Exploration Geophysicists, vol. 31, No. 9, Nov. 2006, 15 pages.

Zhang et al., "A Fast Parallel Algorithm for Thinning Digital Patterns", Communications of the ACM, vol. 27, No. 3, Mar. 1984, pp. 236-239.

Landmark, Seismic Engine, 2020, 4 pages.

GB. App. No. GB2107237.6, "Combined Search and Examination Report", dated Feb. 7, 2022, 9 pages.

* cited by examiner

FAULT SKELETONIZATION FOR FAULT IDENTIFICATION IN A SUBTERRANEAN ENVIRONMENT

TECHNICAL FIELD

The present disclosure relates generally to hydrocarbon exploration and, more particularly (although not necessarily exclusively), to identifying faults in a subterranean environment.

BACKGROUND

Hydrocarbon exploration is the search for hydrocarbons, such as oil or gas, within a subterranean formation. Interpretation of faults in seismic data has a significant impact on hydrocarbon exploration, reservoir characterization, and field development workflows. The faults may represent drilling hazards, an indication of fluid migration of reservoirs, and an indication of compartmentalization of reservoirs. Thus, a comprehensive understanding of faulting in a reservoir may provide significant value for efficient development of hydrocarbon resources.

DETAILED DESCRIPTION

Certain aspects and examples of the present disclosure relate to facilitating hydrocarbon exploration by performing fault skeletonization to identify faults in a subterranean environment. Fault plane geometries and fault networks may represent drilling hazards. Further, the fault plane geometries may determine reservoir connectivity, gross volume, and performance. Interpreting faults rapidly and accurately may provide a significant advantage in facilitating hydrocarbon exploration and wellbore planning operations for the subterranean environment.

Traditional deterministic approaches for imaging faults in seismic data generate fault-likelihood volumes by analyzing the discontinuity and semblance in the seismic data. These approaches tend to generate broad or blurred looking faults. A thinning algorithm can be applied to identify a maximum and generate cleaner or sharper looking faults. This thinning process requires additional information, such as structural dip and strike angle data, to assist the structure oriented filtering process. However, generating these dip and strike angles can take significant time and compute power during the deterministic estimation process. Recent deep learning approaches to fault prediction can generate fault likelihood volumes more efficiently but lack the ability to predict dip and strike angles. As a result, thinning fault likelihood data in a deep learning workflow becomes very difficult and the faults remain blurry.

Fault skeletonization techniques of the present disclosure can thin fault likelihood volumes without dip and strike angle data. Fault likelihood data for a subterranean environment can be received and a binary mask filter can be applied to the fault likelihood data to generate binary distribution data. The binary mask filter can convert the fault likelihood volumes to black pixels and white pixels, where black pixels represent faults and white pixels do not represent faults. The binary distribution data may be pixels arranged in profiles of at least two directions, such as an inline direction and a crossline direction.

Fault skeletonization can be performed on each profile of the binary distribution data to thin the binary distribution data and form fault skeletonization data with connected pixels that represent part of a fracture. The fault skeletonization can include checking each pixel of the binary distribution for certain conditions. Black pixels satisfying the conditions can be converted to white, meaning those pixels do not represent the skeleton of the fault. The fault skeletonization can be repeated until no additional pixels are converted to white. In this manner, the fault skeletonization process can provide thinned fault identification without excessive time and compute power requirements.

The fault skeletonization data can be converted to seismic volume data and the seismic volume data can be combined and filtered in the at least two directions. The seismic volume data with thinned faults can be output as an image for use in planning wellbore operations. For example, areas of the subterranean environment with many faults identified by the image may be avoided during wellbore drilling so as not to lose drilling fluid.

While the present disclosure relates to identifying faults in a subterranean environment, the techniques described can be implemented for other operations, such as to thin predicted seismic surfaces or to improve the success rate of discovering subsurface reservoirs.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
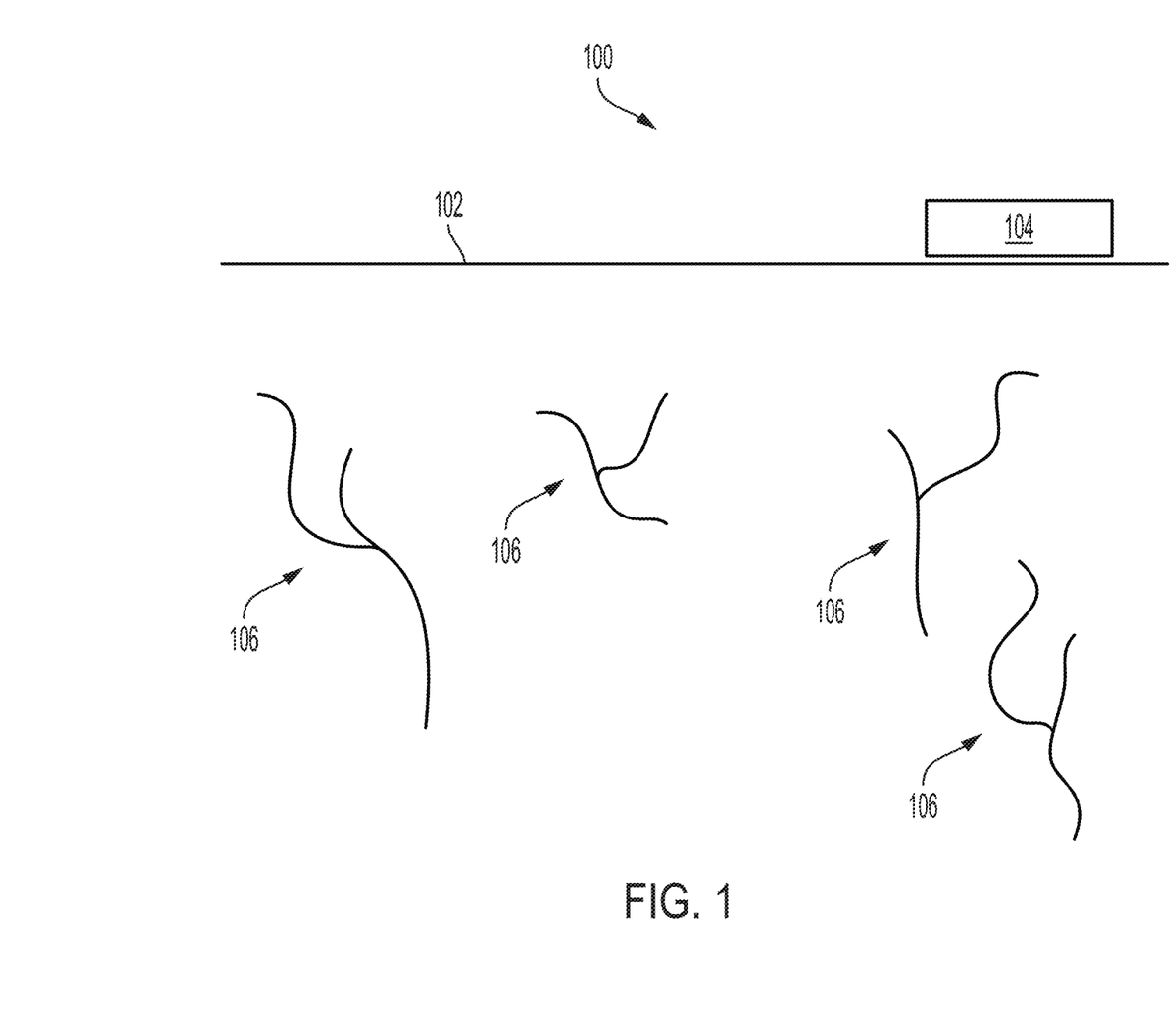
FIG. 1 is a schematic of a subterranean environment with fractures according to one example of the present disclosure.

FIG. 1 is a schematic of a subterranean environment 100 with fractures 106 according to one example of the present disclosure. The fractures 106 are located under a surface 102. A computing device 104 is located on the surface 102.

The computing device 104 can receive data about the subterranean environment 100. For example, the computing device 104 can perform noise reflection operations to generate original seismic data and an image of the subterranean environment 100. The computing device 104 can perform fault skeletonization on the original seismic data to determine the location of the fractures 106 and plan wellbore operates for the subterranean environment 100.

The computing device 104 can perform operations of receiving fault likelihood data, applying a binary mask to the fault likelihood data, and performing fault skeletonization on the binary distribution data to form fault skeletonization data. Additionally, the computing device 104 can convert the fault skeletonization data to seismic volume data, combine and filter the seismic volume data to form combined seismic volume data, and output the combined seismic volume data as an image for use in detecting objects to plan a wellbore operation.

Figure 2:
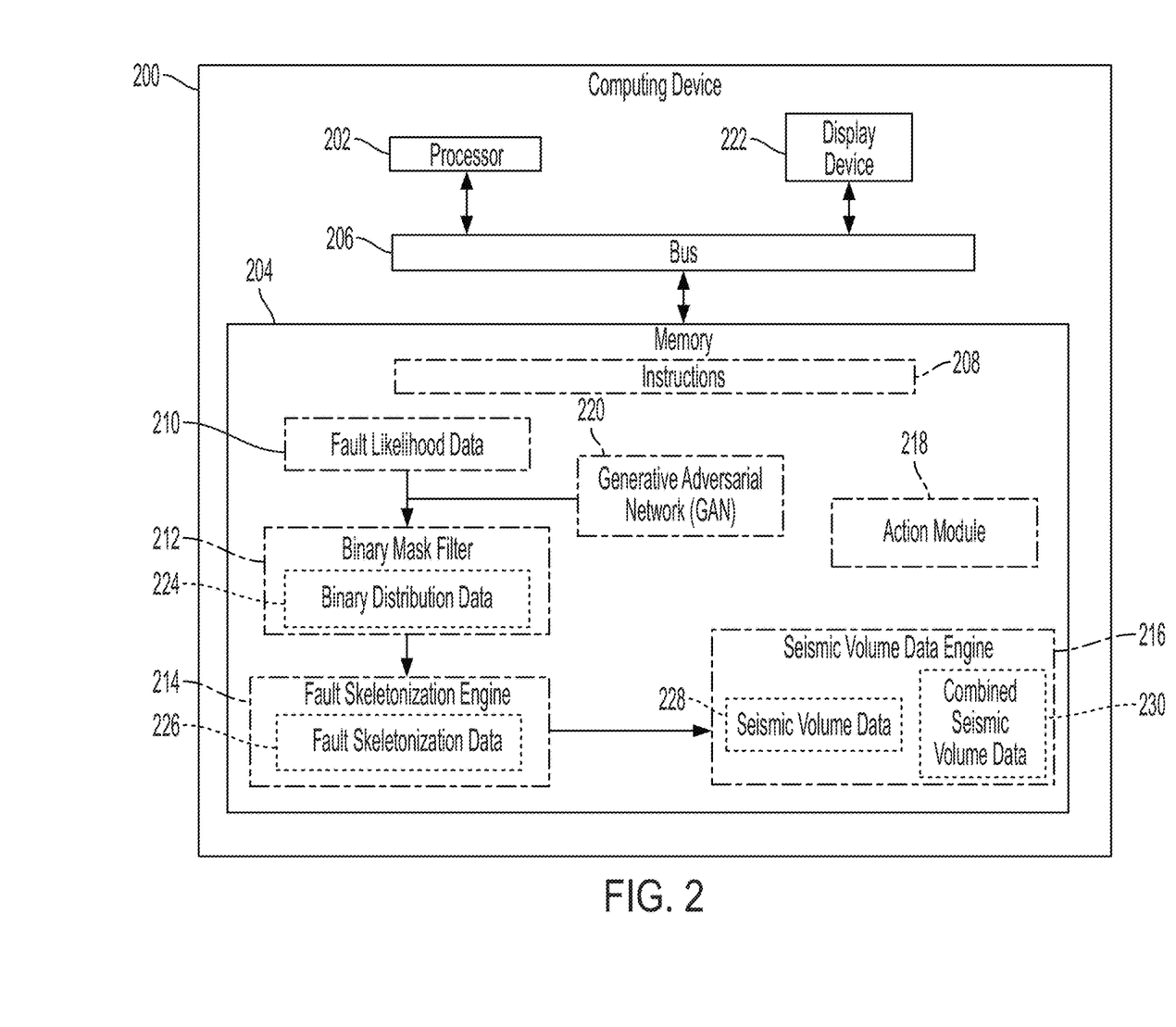
FIG. 2 is a schematic of a computing device for fault skeletonization according to one example of the present disclosure.

FIG. 2 is a schematic of a computing device 200 for fault skeletonization according to one example of the present disclosure. While FIG. 2 depicts the computing device 200 as including certain components, other examples may involve more, fewer, or different components than are shown in FIG. 2. In an example, the computing device 200 may be implemented as the computing device 104, as described above with respect to FIG. 1.

As shown, the computing device 200 includes a processor 202 communicatively coupled to a memory 204 by a bus 206. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 208 stored in the memory 204 to perform operations. In some examples, the instructions 208 can include processor-specific instructions generated by a compiler or an interpreter from code written in any suitable computer-programming language, such as C, C++, C#, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium from which the processor 202 can read instructions 208. A non-transitory computer-readable medium can include electronic, optical, magnetic, or other storage devices capable of providing the processor 202 with the instructions 208 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 208.

In some examples, the computing device 200 includes a display device 222. The display device 222 can represent one or more components used to output data. Examples of the display device 222 can include a liquid-crystal display (LCD), a computer monitor, a touch-screen display, etc.

The computing device 200 may receive fault likelihood data 210 about a subterranean environment. The computing device 200 can receive the fault likelihood data 210 from seismic images generated from a series of seismic surveys taken for an area of the subterranean environment. The area may include a geological area being inspected for future hydrocarbon exploration. The seismic surveys may include transmission of seismic waves into the subterranean environment. The seismic waves may reflect back from the geological formation to one or more seismic wave receivers. Using the reflected seismic waves, the computing device 200 may generate the fault likelihood data 210 that represents a likelihood that a fault is present at a location within the subterranean environment.

In some examples, the computing device 200 can receive the fault likelihood data 210 from a machine learning model. The machine learning model may be a deep learning neural network that is trained with historic seismic images to output the fault likelihood data 210 from the reflected seismic images. The machine learning model can output the fault likelihood data 210 in a SEGY format for further processing. Additionally or alternatively, the computing device 200 can receive the fault likelihood data 210 from deterministic methods. The fault likelihood data 210 may be blurry representations of faults in the subterranean environment.

In some examples, the computing device 200 can apply a Generative Adversarial Network (GAN) 220 to the fault likelihood data 210 to generate data with enhanced resolution. The GAN 220 can be trained with historical data and the computing device 200 can input the fault likelihood data 210 to the GAN 220. Based on the fault likelihood data 210 and the historical data, the GAN 220 can output data in at least two directions (e.g., inline, crossline, or depth) with an enhanced resolution. For the subterranean environment, the data can be output in directions representing an inline direction, a crossline direction, and a depth direction.

The computing device 200 can apply a binary mask filter to convert the fault likelihood data 210 to binary distribution data 224. In examples where the GAN 220 is applied to the fault likelihood data 210, the binary mask filter 212 is applied to the data generated from the GAN 220. A tuning parameter is used by the binary mask filter 212 to convert the fault likelihood data 210 to binary distribution data 224 that has pixels of two values arranged in profiles in the at least two directions. For example, the tuning parameter may be 0.9, so that any value of the fault likelihood data 210 that is above 0.9 is turned into a first value and any value of the fault likelihood data 210 that is below 0.9 is converted to a second value. In some examples, the first value can be one and correspond to black pixels and the second value can be zero and correspond to white pixels. The black pixels of the binary distribution data 224 can indicate locations where fractures may be present in the subterranean formation.

The computing device 200 can include a fault skeletonization engine 214 that can perform fault skeletonization on the binary distribution data 224 for each profile to thin the binary distribution data 224. The fault skeletonization engine 214 can check each pixel of each profile for conditions and perform operations based on satisfying the conditions. The fault skeletonization engine 214 can repeat the checks for each pixel of each profile until no pixels satisfy the conditions. In an example, the fault skeletonization engine 214 can perform fault skeletonization for the pixels of the profile in the inline direction first, then for the pixels of the profile in the crossline direction, and then for the pixels of the profile in the depth direction.

In some examples, the fault skeletonization engine 214 can check for first conditions of a first particular pixel having the first value (e.g., black) and eight neighbors. Each of the eight neighbors can be defined by their position with respect to the first particular pixel. For example, the first particular pixel can be referred to as P1 and have neighbors that are located directly above, below, to the left, to the right, and at the four diagonals to P1. Each of the neighbors can be referred to as one of P2 through P9. For example, the pixel directly above P1 can be P2. The sequence of defining P3 through P9 can continue from P2 in a clockwise direction around P1.

The first conditions can also include that the first particular pixel has between two neighbors and six neighbors that are the first value (e.g., black) and a number of transitions from a second value (e.g., white) to the first value in the sequence of the eight neighbors is one. For example, the sequence of the eight neighbors from P2 to P9 can have values 0, 1, 0, 0, 0, 0, 0, 0, where one is the first value and zero is the second value. The sequence satisfies the condition of one transition from the second value to the first value.

In some examples, the first conditions can also include that at least one of the eight neighbors at a second position (e.g., P2), with respect to the first particular pixel, a fourth position (e.g., P4) with respect to the first particular pixel, or a sixth position (e.g., P6) with respect to the first particular pixel is the second value. Additionally, the first conditions can include at least one of the eight neighbors at the fourth position with respect to the particular pixel, the sixth position with respect to the first particular pixel, or an eighth position with respect to the first particular pixel is the second value.

The fault skeletonization engine 214 can set the first particular pixel to the second value upon verifying the first conditions are satisfied for the first particular pixel. To illustrate, the fault skeletonization engine 214 can determine P1 is black and has eight neighbors. P1 has four neighbors that are black and the number of transitions from white to black in the sequence of the eight neighbors is one. P2 and P8 are white. Therefore, the fault skeletonization engine 214 determines the first conditions are satisfied for P1, so the fault skeletonization engine 214 sets P1 to white. The fault skeletonization engine 214 repeats the check of the first conditions for each pixel of each profile until no pixels satisfy the first conditions.

In some examples, the fault skeletonization engine 214 checks each pixel of each profile for second conditions. The second conditions include that a second particular pixel (e.g., P1) is the first value and has eight neighbors, the second particular pixel has between two neighbors and six neighbors that are the second value, and the number of transitions from the second value to the first value in the sequence of the eight neighbors is one.

Alternative to the first conditions, the second conditions include that at least one of the eight neighbors at the second position (e.g., P2) with respect to the second particular pixel, the fourth position (e.g., P4) with respect to the second particular pixel, or the eighth position (e.g., P8) with respect to the second particular pixel is the second value. Additionally, the second conditions include at least one of the eight neighbors at the second position with respect to the second particular pixel, the sixth position (e.g., P6) with respect to the second particular pixel, or the eighth position with respect to the second particular pixel is the second value.

The fault skeletonization engine 214 can set the second particular pixel to the second value upon verifying the second conditions are satisfied for the second particular pixel. The fault skeletonization engine 214 can repeat checking each pixel of the profiles until no pixel satisfies the second conditions.

The fault skeletonization engine 214 can set pixels that do not represent a skeleton of a fracture to the second value, so the result is fault skeletonization data 226 with pixels connected that represent part of a fracture. The fault skeletonization data 226 is a thinned version of the fault likelihood data 210 that was generated independent of structural dip and strike angle data for the subterranean formation.

In some examples, the computing device 200 can include a seismic volume data engine 216. The seismic volume data engine 216 can convert the fault skeletonization data 226 to seismic volume data 228. The seismic volume data engine 216 can convert the fault skeletonization data 226 by performing conventional computations and transformations on the fault skeletonization data 226.

The seismic volume data engine 216 can combine and filter the seismic volume data 228 to form combined seismic volume data 230. To do this, the seismic volume data engine 216 can stack the pixels of the seismic volume data 228 for each profile in the at least two directions and sum the seismic volume data 228. To illustrate, the profiles in the inline direction, crossline direction, and depth direction can be stacked and summed.

In some examples, the seismic volume data 228 can be filtered with a binary threshold to normalize the values of the seismic volume data 228. The seismic volume data engine 216 can apply the binary threshold to the summed seismic volume data 228 to set pixels with values less than the binary threshold to one and to set pixels with values greater than the threshold to one. An example of the binary threshold can be 0.3. The combined seismic volume data 230 is the result of summing and filtering the seismic volume data 228.

The seismic volume data engine 216 can output the combined seismic volume data 230 as an image for use in detecting objects to plan a wellbore operation. In some examples, the image can include indicators of where faults are located in the subterranean environment. An example of the wellbore operation may be drilling a wellbore. It may not be advantageous to drill a wellbore in a location of the subterranean environment with fractures, so the image can be used to determine where wellbores should be drilled.

The computing device 200 can also include an action module 218. The action module 218 can include executable program code for taking one or more actions based on the output of seismic volume data engine 216. For example, computing device 200 may execute the action module 218 to make a decision about where to drill a wellbore in a subterranean environment based on fault locations identified in the output. The computing device 200 can then generate a graphical user interface (GUI) indicating particular areas that are suitable for further exploration and display the GUI on the display device 222, such as a liquid crystal display or light emitting diode display.

Figure 3:
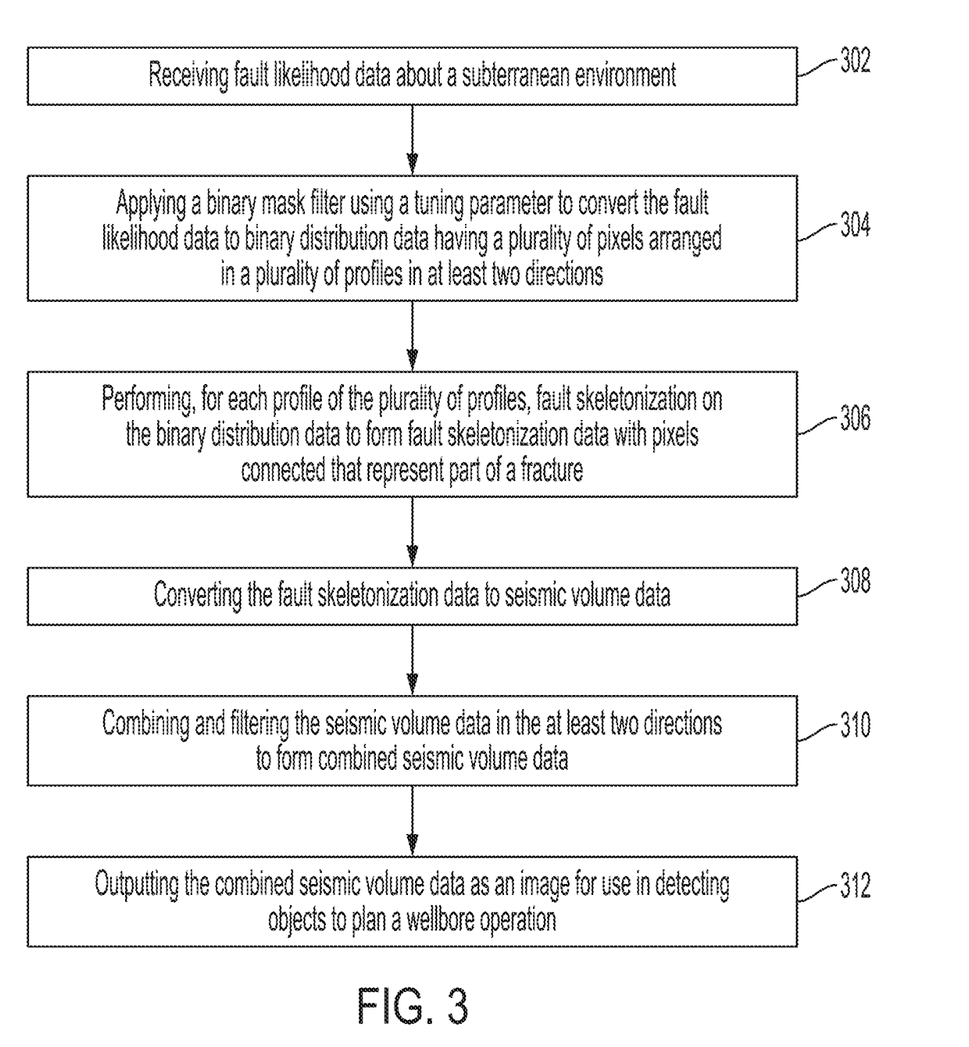
FIG. 3 is a flow chart of a process for fault skeletonization according to one example of the present disclosure.

In some examples, the computing device 200 can implement the process shown in FIG. 3 for effectuating some aspects of the present disclosure. Other examples can involve more operations, fewer operations, different operations, or a different order of the operations shown in FIG. 3. The operations of FIG. 3 are described below with reference to the components shown in FIG. 2.

FIG. 3 is a flow chart of a process for fault skeletonization according to one example of the present disclosure. At block 302, the process involves receiving fault likelihood data 210 about a subterranean environment. The fault likelihood data 210 can be received from a machine learning model, deterministic methods, or some other process.

At block 304, the process involves applying a binary mask filter 212 using a tuning parameter to convert the fault likelihood data 210 to binary distribution data 224 having a plurality of pixels arranged in a plurality of profiles in at least two directions. The binary distribution data 224 has two values for the pixels, where a first value indicates likely fault presence and a second value indicates fault presence is not likely. For fault identification, the profiles are in three directions including an inline direction, a crossline direction, and a depth direction.

At block 306, the process involves performing, for each profile of the plurality of profiles, fault skeletonization on the binary distribution data 224 to form fault skeletonization data 226 with pixels connected that represent part of a fracture. The fault skeletonization involves checking each pixel of the profiles for two sets of conditions. Upon determining the conditions of one of the two sets of conditions are satisfied for a pixel, the pixel can be set to the second value. The fault skeletonization can repeat for each pixel of each profile until no pixels satisfy the two sets of conditions. The fault skeletonization data 226 can represent a thinned skeleton of the binary distribution data 224.

At block 308, the process involves converting the fault skeletonization data 226 to seismic volume data 228. Converting the fault skeletonization data 226 can involve conventional computations to convert from a pixel-based image volume back to a seismic volume.

At block 310, the process involves combining and filtering the seismic volume data 228 in the at least two directions to form combined seismic volume data 230. The at least two directions of the seismic volume data 228 can be stacked and summed to combine the seismic volume data 228. The summed seismic volume data can have a filter, such as a binary threshold, applied to normalize the summed seismic volume data into combined seismic volume data 230.

At block 312, the process involves outputting the combined seismic volume data 230 as an image for use in detecting objects to plan a wellbore operation. The image can indicate locations of the subterranean environment where faults are present. The wellbore operation, such as drilling, may be planned at a location of the subterranean environment where there are no faults indicated in the output so that drilling fluid is not lost.

Figure 4A:
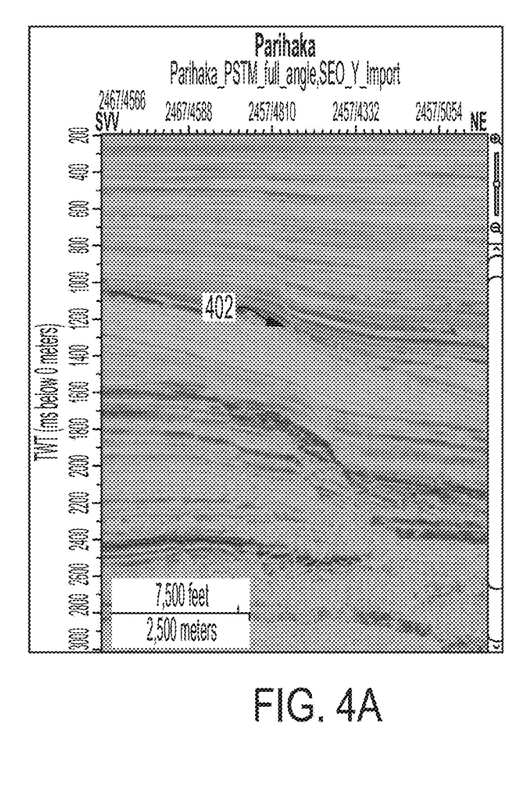
FIG. 4A is a graph of original seismic data for fault skeletonization according to one example of the present disclosure.

FIG. 4A is a graph of original seismic data for fault skeletonization according to one example of the present disclosure. A computing device, such as the computing device 104 in FIG. 1, may determine the original seismic data for a subterranean environment. The original seismic data can include faults that are difficult to see in the original seismic data. An example of a fault in the original seismic data is fault 402. The original seismic data is represented as profiles in two directions, but it is possible to represent the original seismic data in more than two directions.

Figure 4B:
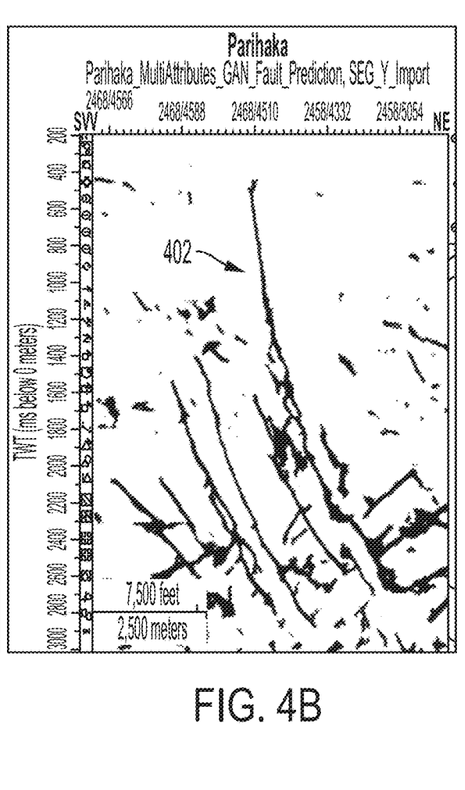
FIG. 4B is a graph of binary distribution data for fault skeletonization according to one example of the present disclosure.

FIG. 4B is a graph of binary distribution data for fault skeletonization according to one example of the present disclosure. The binary distribution data can be generated from fault likelihood data based on the original seismic data of FIG. 4A. The binary distribution data shows two pixel values, black and white, where black indicates areas of the subterranean environment with high likelihood of a fault being present. The fault 402 is easier to see in the binary distribution data, but the binary distribution data is blurry and the precise location of faults can be difficult to determine from the binary distribution data.

Figure 4C:
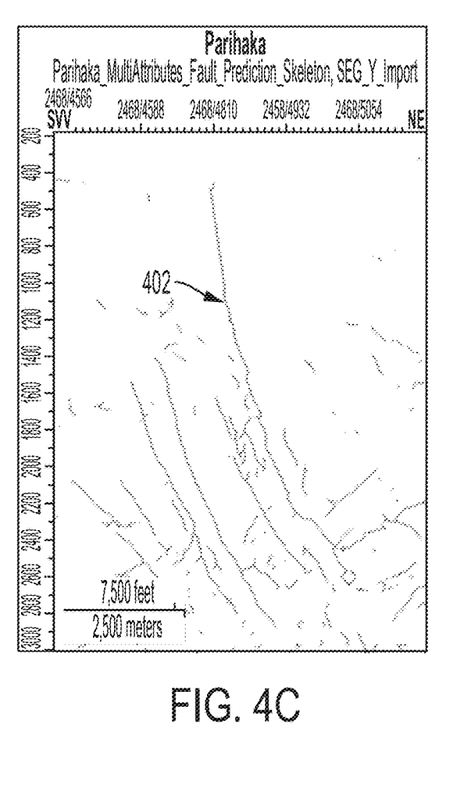
FIG. 4C is a graph of combined seismic volume data after fault skeletonization according to one example of the present disclosure.

FIG. 4C is a graph of combined seismic volume data after fault skeletonization according to one example of the present disclosure. The combined seismic volume data can be generated from a fault skeletonization process to form fault skeletonization data with pixels connected that represent a part of a fracture. The fault skeletonization data for each profile in the two directions can then be converted to seismic volume data, combined, and filtered to produce combined seismic data. The combined seismic data provides a thinned skeleton of the faults in the subterranean environment. The location of fault 402 is more precisely represented in the combined seismic data than the binary distribution data. The combined seismic data can be output to be used detecting object to plan a wellbore operation.

In some aspects, a system, a method, and a non-transitory computer readable medium for fault skeletonization are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processing device; and a memory device that includes instructions executable by the processing device for causing the processing device to perform operations comprising: receiving fault likelihood data about a subterranean environment; applying a binary mask filter using a tuning parameter to convert the fault likelihood data to binary distribution data having a plurality of pixels arranged in a plurality of profiles in at least two directions; performing, for each profile of the plurality of profiles, fault skeletonization on the binary distribution data to form fault skeletonization data with pixels connected that represent part of a fracture; converting the fault skeletonization data to seismic volume data; combining and filtering the seismic volume data in the at least two directions to form combined seismic volume data; and outputting the combined seismic volume data as an image for use in detecting objects to plan a wellbore operation.

Example 2 is the system of example 1, wherein the memory device further includes instructions executable by the processing device for causing the processing device to apply a Generative Adversarial Network to the fault likelihood data to generate data with enhanced resolution prior to applying the binary mask filter.

Example 3 is the system of examples 1-2, wherein the memory device further includes instructions executable by the processing device for causing the processing device to perform fault skeletonization by performing operations comprising: checking each pixel of the plurality of pixels for a first plurality of conditions, the first plurality of conditions comprising: a first particular pixel has a first value and eight neighbors, wherein each of the eight neighbors is defined by their position with respect to the first particular pixel; the first particular pixel has between two neighbors and six neighbors that are the first value; a number of transitions from a second value to the first value in a sequence of the eight neighbors is one; at least one of the eight neighbors at a second position with respect to the first particular pixel, a fourth position with respect to the first particular pixel, or a sixth position with respect to the first particular pixel is the second value; and at least one of the eight neighbors at the fourth position with respect to the first particular pixel, the sixth position with respect to the first particular pixel, or an eighth position with respect to the first particular pixel is the second value; setting the first particular pixel to the second value upon verifying the first plurality of conditions is satisfied for the first particular pixel; repeating checking each pixel of the plurality of pixels until no pixel of the plurality of pixels satisfies the first plurality of conditions.

Example 4 is the system of examples 1-3, wherein the memory device further includes instructions executable by the processing device for causing the processing device to perform fault skeletonization by performing operations comprising: checking each pixel of the plurality of pixels for a second plurality of conditions, the second plurality of conditions comprising: a second particular pixel is the first value and has eight neighbors, wherein each of the eight neighbors is defined by their position with respect to the second particular pixel; the second particular pixel has between two neighbors and six neighbors that are the second value; the number of transitions from the second value to the first value in the sequence of the eight neighbors is one; at least one of the eight neighbors at the second position with respect to the second particular pixel, the fourth position with respect to the second particular pixel, or the eighth position with respect to the second particular pixel is the second value; and at least one of the eight neighbors at the second position with respect to the second particular pixel, the sixth position with respect to the second particular pixel, or the eighth position with respect to the second particular pixel is the second value; setting the second particular pixel to the second value upon verifying the second plurality of conditions is satisfied for the second particular pixel; and repeating checking each pixel of the plurality of pixels until no pixel of the plurality of pixels satisfies the second plurality of conditions.

Example 5 is the system of examples 1-4, wherein the memory device further includes instructions executable by the processing device for causing the processing device to receive fault likelihood data about the subterranean environment from a machine learning model.

Example 6 is the system of examples 1-5, wherein the memory device further includes instructions executable by the processing device for causing the processing device to perform the operations independent of structural dip and strike angle data for the subterranean environment.

Example 7 is the system of examples 1-6, wherein the plurality of profiles are in three directions comprising an inline direction, a crossline direction, and a depth direction.

Example 8 is a method, comprising: receiving fault likelihood data about a subterranean environment; applying a binary mask filter using a tuning parameter to convert the fault likelihood data to binary distribution data having a plurality of pixels arranged in a plurality of profiles in at least two directions; performing, for each profile of the plurality of profiles, fault skeletonization on the binary distribution data to form fault skeletonization data with pixels connected that represent part of a fracture; converting the fault skeletonization data to seismic volume data; combining and filtering the seismic volume data in the at least two directions to form combined seismic volume data; and outputting the combined seismic volume data as an image for use in detecting objects to plan a wellbore operation.

Example 9 is the method of example 8, further comprising applying a Generative Adversarial Network to the fault likelihood data to generate data with enhanced resolution prior to applying the binary mask filter.

Example 10 is the method of examples 8-9, wherein performing fault skeletonization comprises: checking each pixel of the plurality of pixels for a first plurality of conditions, the first plurality of conditions comprising: a first particular pixel has a first value and eight neighbors, wherein each of the eight neighbors is defined by their position with respect to the first particular pixel; the first particular pixel has between two neighbors and six neighbors that are the first value; a number of transitions from a second value to the first value in a sequence of the eight neighbors is one; at least one of the eight neighbors at a second position with respect to the first particular pixel, a fourth position with respect to the first particular pixel, or a sixth position with respect to the first particular pixel is the second value; and at least one of the eight neighbors at the fourth position with respect to the first particular pixel, the sixth position with respect to the first particular pixel, or an eighth position with respect to the first particular pixel is the second value; setting the first particular pixel to the second value upon verifying the first plurality of conditions is satisfied for the first particular pixel; repeating checking each pixel of the plurality of pixels until no pixel of the plurality of pixels satisfies the first plurality of conditions.

Example 11 is the method of examples 8-10, wherein performing fault skeletonization further comprises: checking each pixel of the plurality of pixels for a second plurality of conditions, the second plurality of conditions comprising: a second particular pixel is the first value and has eight neighbors, wherein each of the eight neighbors is defined by their position with respect to the second particular pixel; the second particular pixel has between two neighbors and six neighbors that are the second value; the number of transitions from the second value to the first value in the sequence of the eight neighbors is one; at least one of the eight neighbors at the second position with respect to the second particular pixel, the fourth position with respect to the second particular pixel, or the eighth position with respect to the second particular pixel is the second value; and at least one of the eight neighbors at the second position with respect to the second particular pixel, the sixth position with respect to the second particular pixel, or the eighth position with respect to the second particular pixel is the second value; setting the second particular pixel to the second value upon verifying the second plurality of conditions is satisfied for the second particular pixel; and repeating checking each pixel of the plurality of pixels until no pixel of the plurality of pixels satisfies the second plurality of conditions.

Example 12 is the method of examples 8-11, further comprising receiving fault likelihood data about the subterranean environment from a machine learning model.

Example 13 is the method of examples 8-12, further comprising performing the operations independent of structural dip and strike angle data for the subterranean environment.

Example 14 is the method of examples 8-13, wherein the plurality of profiles are in three directions comprising an inline direction, a crossline direction, and a depth direction.

Example 15 is a non-transitory computer-readable medium comprising instructions that are executable by a processing device for causing the processing device to perform operations comprising: receiving fault likelihood data about a subterranean environment; applying a binary mask filter using a tuning parameter to convert the fault likelihood data to binary distribution data having a plurality of pixels arranged in a plurality of profiles in at least two directions; performing, for each profile of the plurality of profiles, fault skeletonization on the binary distribution data to form fault skeletonization data with pixels connected that represent part of a fracture; converting the fault skeletonization data to seismic volume data; combining and filtering the seismic volume data in the at least two directions to form combined seismic volume data; and outputting the combined seismic volume data as an image for use in detecting objects to plan a wellbore operation.

Example 16 is the non-transitory computer-readable medium of example 15, further comprising instructions executable by the processing device for causing the processing device to apply a Generative Adversarial Network to the fault likelihood data to generate data with enhanced resolution prior to applying the binary mask filter.

Example 17 is the non-transitory computer-readable medium of examples 15-16, further comprising instructions executable by the processing device for causing the processing device to perform fault skeletonization by performing operations comprising: checking each pixel of the plurality of pixels for a first plurality of conditions, the first plurality of conditions comprising: a first particular pixel has a first value and eight neighbors, wherein each of the eight neighbors is defined by their position with respect to the first particular pixel; the first particular pixel has between two neighbors and six neighbors that are the first value; a number of transitions from a second value to the first value in a sequence of the eight neighbors is one; at least one of the eight neighbors at a second position with respect to the first particular pixel, a fourth position with respect to the first particular pixel, or a sixth position with respect to the first particular pixel is the second value; and at least one of the eight neighbors at the fourth position with respect to the first particular pixel, the sixth position with respect to the first particular pixel, or an eighth position with respect to the first particular pixel is the second value; setting the first particular pixel to the second value upon verifying the first plurality of conditions is satisfied for the first particular pixel; repeating checking each pixel of the plurality of pixels until no pixel of the plurality of pixels satisfies the first plurality of conditions.

Example 18 is the non-transitory computer-readable medium of examples 15-17, further comprising instructions executable by the processing device for causing the processing device to perform fault skeletonization by performing operations comprising: checking each pixel of the plurality of pixels for a second plurality of conditions, the second plurality of conditions comprising: a second particular pixel is the first value and has eight neighbors, wherein each of the eight neighbors is defined by their position with respect to the second particular pixel; the second particular pixel has between two neighbors and six neighbors that are the second value; the number of transitions from the second value to the first value in the sequence of the eight neighbors is one; at least one of the eight neighbors at the second position with respect to the second particular pixel, the fourth position with respect to the second particular pixel, or the eighth position with respect to the second particular pixel is the second value; and at least one of the eight neighbors at the second position with respect to the second particular pixel, the sixth position with respect to the second particular pixel, or the eighth position with respect to the second particular pixel is the second value; setting the second particular pixel to the second value upon verifying the second plurality of conditions is satisfied for the second particular pixel; and repeating checking each pixel of the plurality of pixels until no pixel of the plurality of pixels satisfies the second plurality of conditions.

Example 19 is the non-transitory computer-readable medium of examples 15-18, further comprising includes instructions executable by the processing device for causing the processing device to receive fault likelihood data about the subterranean environment from a machine learning model.

Example 20 is the non-transitory computer-readable medium of examples 15-19, further comprising instructions executable by the processing device for causing the processing device to perform the operations independent of structural dip and strike angle data for the subterranean environment.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
    receiving fault likelihood data about a subterranean environment;
    applying a binary mask filter using a tuning parameter to convert the fault likelihood data to binary distribution data having a plurality of pixels arranged in a plurality of profiles in at least two directions;
    performing, for each profile of the plurality of profiles, fault skeletonization on the binary distribution data to form fault skeletonization data with pixels connected that represent part of a fracture, the fault skeletonization comprising:
        checking each pixel of the plurality of pixels for a first plurality of conditions:
        setting a first particular pixel having a first value to a second value upon verifying the first plurality of conditions is satisfied for the first particular pixel based on neighboring pixels of the first particular pixel; and
        repeating checking each pixel of the plurality of pixels until no pixel of the plurality of pixels satisfies the first plurality of conditions;
    converting the fault skeletonization data to seismic volume data;
    combining and filtering the seismic volume data in the at least two directions to form combined seismic volume data; and
    outputting the combined seismic volume data as an image for use in detecting objects to plan a wellbore operation.

2. The system of claim 1, wherein the memory device further includes instructions executable by the processing device for causing the processing device to apply a Generative Adversarial Network to the fault likelihood data to generate data with enhanced resolution prior to applying the binary mask filter.

3. The system of claim 1, wherein
the first plurality of conditions comprise:
    the first particular pixel has eight neighbors, wherein each of the eight neighbors is defined by their position with respect to the first particular pixel;
    the first particular pixel has between two neighbors and six neighbors that are the first value; and
    a number of transitions from a second value to the first value in a sequence of the eight neighbors is one.

4. The system of claim 1, wherein the memory device further includes instructions executable by the processing device for causing the processing device to perform fault skeletonization by performing operations comprising:
    checking each pixel of the plurality of pixels for a second plurality of conditions, the second plurality of conditions comprising:
        a second particular pixel is the first value and has eight neighbors, wherein each of the eight neighbors is defined by their position with respect to the second particular pixel;
        the second particular pixel has between two neighbors and six neighbors that are the second value;
        the number of transitions from the second value to the first value in the sequence of the eight neighbors is one;
        at least one of the eight neighbors at the second position with respect to the second particular pixel, the fourth position with respect to the second particular pixel, or the eighth position with respect to the second particular pixel is the second value; and
at least one of the eight neighbors at the second position with respect to the second particular pixel, the sixth position with respect to the second particular pixel, or the eighth position with respect to the second particular pixel is the second value;
setting the second particular pixel to the second value upon verifying the second plurality of conditions is satisfied for the second particular pixel; and
repeating checking each pixel of the plurality of pixels until no pixel of the plurality of pixels satisfies the second plurality of conditions.

5. The system of claim 1, wherein the memory device further includes instructions executable by the processing device for causing the processing device to receive fault likelihood data about the subterranean environment from a machine learning model.

6. The system of claim 1, wherein the memory device further includes instructions executable by the processing device for causing the processing device to perform the operations independent of structural dip and strike angle data for the subterranean environment.

7. The system of claim 1, wherein the plurality of profiles are in three directions comprising an inline direction, a crossline direction, and a depth direction.

8. A method, comprising:
receiving fault likelihood data about a subterranean environment;
applying a binary mask filter using a tuning parameter to convert the fault likelihood data to binary distribution data having a plurality of pixels arranged in a plurality of profiles in at least two directions;
performing, for each profile of the plurality of profiles, fault skeletonization on the binary distribution data to form fault skeletonization data with pixels connected that represent part of a fracture, the fault skeletonization comprising:
checking each pixel of the plurality of pixels for a first plurality of conditions;
setting a first particular pixel having a first value to a second value upon verifying the first plurality of conditions is satisfied for the first particular pixel based on neighboring pixels of the first particular pixel; and
repeating checking each pixel of the plurality of pixels until no pixel of the plurality of pixels satisfies the first plurality of conditions;
converting the fault skeletonization data to seismic volume data;
combining and filtering the seismic volume data in the at least two directions to form combined seismic volume data; and
outputting the combined seismic volume data as an image for use in detecting objects to plan a wellbore operation.

9. The method of claim 8, further comprising applying a Generative Adversarial Network to the fault likelihood data to generate data with enhanced resolution prior to applying the binary mask filter.

10. The method of claim 8, wherein
the first plurality of conditions comprise:
the first particular pixel has eight neighbors, wherein each of the eight neighbors is defined by their position with respect to the first particular pixel;
at least one of the eight neighbors at a second position with respect to the first particular pixel, a fourth position with respect to the first particular pixel, or a sixth position with respect to the first particular pixel is the second value; and
at least one of the eight neighbors at the fourth position with respect to the first particular pixel, the sixth position with respect to the first particular pixel, or an eighth position with respect to the first particular pixel is the second value.

11. The method of claim 8, wherein performing fault skeletonization further comprises:
checking each pixel of the plurality of pixels for a second plurality of conditions, the second plurality of conditions comprising:
a second particular pixel is the first value and has eight neighbors, wherein each of the eight neighbors is defined by their position with respect to the second particular pixel;
the second particular pixel has between two neighbors and six neighbors that are the second value;
the number of transitions from the second value to the first value in the sequence of the eight neighbors is one;
at least one of the eight neighbors at the second position with respect to the second particular pixel, the fourth position with respect to the second particular pixel, or the eighth position with respect to the second particular pixel is the second value; and
at least one of the eight neighbors at the second position with respect to the second particular pixel, the sixth position with respect to the second particular pixel, or the eighth position with respect to the second particular pixel is the second value;
setting the second particular pixel to the second value upon verifying the second plurality of conditions is satisfied for the second particular pixel; and
repeating checking each pixel of the plurality of pixels until no pixel of the plurality of pixels satisfies the second plurality of conditions.

12. The method of claim 8, further comprising receiving fault likelihood data about the subterranean environment from a machine learning model.

13. The method of claim 8, further comprising performing the operations independent of structural dip and strike angle data for the subterranean environment.

14. The method of claim 8, wherein the plurality of profiles are in three directions comprising an inline direction, a crossline direction, and a depth direction.

15. A non-transitory computer-readable medium comprising instructions that are executable by a processing device for causing the processing device to perform operations comprising:
receiving fault likelihood data about a subterranean environment;
applying a binary mask filter using a tuning parameter to convert the fault likelihood data to binary distribution data having a plurality of pixels arranged in a plurality of profiles in at least two directions;
performing, for each profile of the plurality of profiles, fault skeletonization on the binary distribution data to form fault skeletonization data with pixels connected that represent part of a fracture, the fault skeletonization comprising:
checking each pixel of the plurality of pixels for a first plurality of conditions;
setting a first particular pixel having a first value to a second value upon verifying the first plurality of conditions is satisfied for the first particular pixel based on neighboring pixels of the first particular pixel; and repeating checking each pixel of the plurality of pixels until no pixel of the plurality of pixels satisfies the first plurality of conditions;

converting the fault skeletonization data to seismic volume data;

combining and filtering the seismic volume data in the at least two directions to form combined seismic volume data; and outputting the combined seismic volume data as an image for use in detecting objects to plan a wellbore operation.

16. The non-transitory computer-readable medium of claim 15, further comprising instructions executable by the processing device for causing the processing device to apply a Generative Adversarial Network to the fault likelihood data to generate data with enhanced resolution prior to applying the binary mask filter.

17. The non-transitory computer-readable medium of claim 15,
wherein the first plurality of conditions comprise:
the first particular pixel has eight neighbors, wherein each of the eight neighbors is defined by their position with respect to the first particular pixel;
the first particular pixel has between two neighbors and six neighbors that are the first value;
a number of transitions from a second value to the first value in a sequence of the eight neighbors is one;
at least one of the eight neighbors at a second position with respect to the first particular pixel, a fourth position with respect to the first particular pixel, or a sixth position with respect to the first particular pixel is the second value; and
at least one of the eight neighbors at the fourth position with respect to the first particular pixel, the sixth position with respect to the first particular pixel, or an eighth position with respect to the first particular pixel is the second value.

18. The non-transitory computer-readable medium of claim 15, further comprising instructions executable by the processing device for causing the processing device to perform fault skeletonization by performing operations comprising:
checking each pixel of the plurality of pixels for a second plurality of conditions, the second plurality of conditions comprising:
a second particular pixel is the first value and has eight neighbors, wherein each of the eight neighbors is defined by their position with respect to the second particular pixel;
the second particular pixel has between two neighbors and six neighbors that are the second value;
the number of transitions from the second value to the first value in the sequence of the eight neighbors is one;
at least one of the eight neighbors at the second position with respect to the second particular pixel, the fourth position with respect to the second particular pixel, or the eighth position with respect to the second particular pixel is the second value; and
at least one of the eight neighbors at the second position with respect to the second particular pixel, the sixth position with respect to the second particular pixel, or the eighth position with respect to the second particular pixel is the second value;
setting the second particular pixel to the second value upon verifying the second plurality of conditions is satisfied for the second particular pixel; and
repeating checking each pixel of the plurality of pixels until no pixel of the plurality of pixels satisfies the second plurality of conditions.

19. The non-transitory computer-readable medium of claim 15, further comprising includes instructions executable by the processing device for causing the processing device to receive fault likelihood data about the subterranean environment from a machine learning model.

20. The non-transitory computer-readable medium of claim 15, further comprising instructions executable by the processing device for causing the processing device to perform the operations independent of structural dip and strike angle data for the subterranean environment.

* * * * *